United States Patent Office 3,824,246
Patented July 16, 1974

3,824,246
PROCESS FOR THE PREPARATION OF 2-SUBSTITUTED-1,3,4-THIADIAZOLE-5-THIOLS
George W. Huffman, Carmel, and Bryan B. Molloy, Indianapolis, Ind., assignors to Eli Lilly and Company, Indianapolis, Ind.
No Drawing. Filed Sept. 5, 1972, Ser. No. 285,972
Int. Cl. C07d 91/62
U.S. Cl. 260—302 SD          5 Claims

ABSTRACT OF THE DISCLOSURE

A new and more efficient process for the preparation of 2-substituted-1,3,4-thiadiazole-5-thiols which produces yields of 85–90% or higher comprises sequentially treating a thioamide with hydrazine, carbon disulfide, an alkali-metal hydroxide and acid. The thiols are useful intermediates for certain cephalosporin antibiotics.

BACKGROUND OF THE INVENTION

Field of the Invention

2-Substituted-1,3,4-thiadiazole-5-thiols are valuable intermediates in the preparation of biologically active cephalosporins, for example, 7-(sydnone-3-acetamido)-3-(5-methyl - 1,3,4 - thiadiazol - 2 - ylthiomethyl)-3-cephem-4-carboxylic acid and 7-sydnone-3-acetamido)-3-(5-phenyl-1,3,4-thiadiazol - 2 - ylthiomethyl)-3-cephem-4-carboxylic acid, both described in U.S. Pat. No. 3,530,123. Other 2-substituted-1,3,4-thiadiazole-5-thiol cephalosporin derivatives are described in South African Pat. No. 68 02,695; Chem. Abstr. 71, 124458r (1969).

Description of the Prior Art

2-Methyl-1,3,4-thiadiazole-5-thiol has been previously prepared according to the following method: Sandstrom and Wennerbeck, *Acta. Chem. Scand.* 20, 57 (1966) prepared 2-methyl-1,3,4-thiadiazole-5-thiol in 74% yield by the method of Goerdeler et al., *Chem. Ber.* 89, 1534 (1956) which teaches in principle the preparation of 2 methyl-1,3,4-thiadiazole-5-thiol from 2-amino-5-methyl-1,3,4-thiadiazole by (a) diazotization and conversion to 2-bromo-5-methyl-1,3,4 - thiadiazole with hydrobromic acid; (b) conversion of the 2-bromo-5-methyl-1,3,4-thiadiazole to 2-methyl-1,3,4-thiadiazole-5-thiol by treatment with thiourea in base.

2-Phenyl-1,3,4-thiadiazole-5-thiol has been prepared from thiobenzoic acid hydrazide, potassium hydroxide and carbon disulfide as described by Young and Wood, *J. Amer. Chem. Soc.* 77, 400 (1955).

2-Benzyl-1,3,4-thiadiazole-5-thiol has been prepared from phenylacetothiohydrazide, carbon disulfide and potassium hydroxide as described by Jensen and Pedersen, *Acta. Chem. Scand.* 15, 1124 (1961); *Chem. Abstr.* 56, 14162i (1962).

It is an object of the present invention to provide a commercial process for the preparation of 2-substituted-1,3,4-thiadiazole-5-thiols. It is a further object to provide a convenient single batch process for the synthesis of the subject compounds.

SUMMARY OF THE INVENTION

This invention relates to a novel process for the preparation of a 2-substituted-1,3,4-thiadiazole-5-thiol represented by the formula

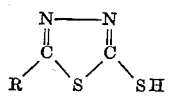

wherein R represents $C_1$–$C_4$ lower alkyl, benzyl or phenyl. The instant 2-substituted-1,3,4-thiadiazole-5-thiols are prepared in superior yields of about 85 to about 90% by a single batch process which comprises sequentially reacting in an inert solvent equimolar quantities of a thioamide

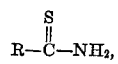

wherein R is the same as defined above, hydrazine, and an alkali-metal hydroxide and carbon disulfide in excess and acidifying to recover the product.

DETAILED DESCRIPTION OF THE INVENTION

According to the process of this invention a 2-substituted-1,3,4-thiadiazole-5-thiol of the formula

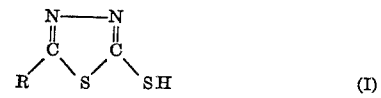

wherein R represents $C_1$–$C_4$ lower alkyl, benzyl or phenyl is prepared in excellent yields by a single batch method which is adaptable to large scale commercial manufacture, which process comprises sequentially reacting in an inert solvent equimolar amounts of a thioamide,

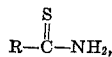

wherein R is the same as defined above, hydrazine, and an alkali metal hydroxide and a excess of carbon disulfide, and acidifying with an acid to recover the product.

The process comprises first reacting a thioamide,

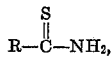

with hydrazine which presumably produces an amidrazone,

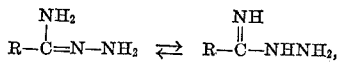

by displacement of gaseous hydrogen sulfide. The amidrazone, generated *in situ*, is reacted with excess carbon disulfide under basic conditions to form an iminodithiocarbazate,

which cyclizes to the 2-substituted-1,3,4-thiadiazole-5-thiol salt by displacement of ammonia. The insoluble product is recovered from the salt by acidification.

Illustrative of the compounds represented by Formula I are the following:

2-Methyl-1,3,4-thiadiazole-5-thiol
2-Ethyl-1,3,4-thiadiazole-5-thiol
2-Propyl-1,3,4-thiadiazole-5-thiol
2-Isopropyl-1,3,4-thiadiazole-5-thiol
2-*tert*-Butyl-1,3,4-thiadiazole-5-thiol
2-Benzyl-1,3,4-thiadiazole-5-thiol
2-Phenyl-1,3,4-thiadiazole-5-thiol The thioamides

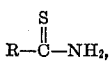

starting materials for the process, are commercially available or are prepared according to known methods [E. E. Reid, "Organic Chemistry of Bivalent Sulfur," Vol. IV, Chemical Publishing Co., Inc., New York, N.Y., pp. 45–52 (1962)]. Representative thioamides such as thioacetamide, thiobenzamide, thiobutyramide, isothiobutyramide, thiophenylacetamide, and thiopivalamide can be used in the instant process.

The process of this invention is carried out in the following manner. Initially, one molar equivalent each of the thioamide and hydrazine are reacted in an inert solvent at a temperature between 0° and 60° C. Commercial grade thioamides can ordinarily be used; however, poor quality starting material is desirably purified prior to use. Thioamides which are dark in color due to impurities may be decolorized by treatment with carbon prior to their use in the process. Anhydrous hydrazine may be used, but it is more economical and convenient to employ the hydrate. The order of addition of hydrazine and thioamide is not important; however, use of a 1:1 molar ratio of the reactants is important in that it minimizes the formation of a 3,6-disubstituted-tetrazine by-product, thereby affording greater yields of the thiadiazole.

Subsequently, one molar equivalent of an alkali-metal hydroxide and at least one molar equivalent of carbon disulfide are added to the reaction mixture. An excess of carbon disulfide is desirably used to insure complete reaction. The order of addition of the hydroxide and carbon disulfide is not critical.

However, because carbon disulfide is a highly toxic substance with a low flash point, the addition of carbon disulfide and the alkali-metal hydroxide is preferably carried out at a temperature below room temperature, for example, between about 0 and 10° C. At these temperatures the hazards associated with the use of large quantities of carbon disulfide are minimized. Moreover, when the addition is carried out in the cold, the evolution of the gaseous by-product, hydrogen sulfide, is more readily delayed until the acidification of the reaction mixture as described hereinafter in more detail.

Alkali-metal hydroxides such as sodium, potassium or lithium hydroxide can be used. For example, potassium hydroxide can be used as an aqueous solution or preferably as an alcoholic solution.

After the reactants are combined in the cold, the process is completed at a temperature of about 30° C. in several hours, and the product is recovered by acidification of the reaction mixture with acid. The process can be operated at high temperatures, for example, at the reflux temperature of the solvent system with volatilization of excess carbon disulfide; however, no improvement in yields accrues thereby.

Solvents which can be employed in the present process are commonly used reaction solvents which are unreactive with the starting materials and the products. Lower alcohols such as methanol, ethanol and propanol are acceptable; but ethanol is preferred. The lower alcohols can be used neat, but it is preferable to use aqueous mixtures for the reaction media.

Hydrogen sulfide gas is a by-product of the process, and the reaction temperature sequence is desirably modified to control the release of the gas until the acidification step. Sixty percent of the hydrogen sulfide is liberated in about 10 minutes when the carbon disulfide and potassium hydroxide addition is carried out at about 30° C. When the temperature is held below about 10° C. during the addition of carbon disulfide and is then raised to about 30° C. for the reaction, less than 5% of the gas is released prior to acidification. The bulk of the hydrogen sulfide is thereafter liberated during acidification, and the acid addition can be regulated to control the rate of hydrogen sulfide evolution. For example, efficient absorption in caustic scrubbers is possible with controlled release of the gas.

Mineral acids such as hydrochloric acid, phosphoric acid or sulfuric acid can be used to acidify the reaction mixture. A preferred mineral acid is sulfuric acid. The insoluble reaction product, the 2-substituted-1,3,4-thiadiazole-5-thiol, precipitates from the acidified reaction mixture and is recovered by filtration.

In a preferred embodiment of this invention, one molar equivalent of hydrazine hydrate is added to thioacetamide in ethanol at a temperature of about 10° C. The reactants are stirred for about 1 hour, and the reaction mixture is cooled to about 0° C. Carbon disulfide, two molar equivalents, is added while the temperature of the reaction mixture is maintained below 10° C. One molar equivalent of potassium hydroxide dissolved in alcohol is added to the cold mixture. Upon completion of the alcohol-alkali addition, the reaction mixture is warmed to about 30° C. and is stirred for 2 hours at that temperature.

Concentrated sulfuric acid is added to the reaction mixture at a rate such that the hydrogen sulfide which is evolved is absorbed by the caustic scrubbers provided for that purpose. Upon completion of the acid addition, the reaction mixture is cooled to a temperature below 30° C., and the mixture is stirred for about 30 minutes. The reaction mixture is cooled to about 15° C., and subjected to reduced pressure for 90 minutes to remove traces of hydrogen sulfide. Atmospheric pressure is restored, and the mixture is diluted with water. Water and alcohol are distilled off under reduced pressure at a temperature of 50° C. The mixture is again diluted with water at atmospheric pressure and cooled to about 10° C. to precipitate 2-methyl-1,3,4-thiadiazole-5-thiol. The product is collected by filtration; the filter cake is washed with the water to remove sulfate salts; and the product is dried at 60° C.

The 2-methyl-1,3,4-thiadiazole-5-thiol produced by this process usually contains 1% or less of 2,5-dimercapto-1,3,4-thiadiazole. The impurity is separated by reprecipitation of the product from water or by recrystallization of the product.

Example 1

Thioacetamide, 0.75 g. (10 millimoles), was added to 0.32 g. (10 millimoles) of anhydrous hydrazine, in 50 ml. ethanol, at room temperature. The mixture was stirred for about 30 minutes, and 0.56 g. (10 millimoles) of potassium hydroxide was dissolved in the reaction mixture. Carbon disulfide, 25 ml., was added to the reaction mixture, and stirring was continued for about 30 minutes. The reaction mixture was cooled and carefully acidified with concentrated sulfuric acid to bring about precipitation of the insoluble product from its salt. The product was collected and dried to yield 1.08 g. (77%) of 2-methyl-1,3,4-thiadizole-5-thiol, m.p. about 183° C.

*Analysis.*—Calcd. for $C_3H_4N_2S_2$: C, 27.28; H, 3.05; N, 21.21; S, 48.46. Found: C, 27.06; H, 3.15; N, 20.94; S, 48.37.

Example 2

Following the method of Example 1, thiobenzamide is reacted with a molar equivalent of hydrazine in ethanol solution. Potassium hydroxide, in molar equivalent amount is dissolved in the reaction mixture, and excess carbon disulfide is added. The reaction is completed by warming on the steam bath. The reaction mixture is cooled in an ice bath and carefully acidified with concentrated sulfuric acid. The precipitated product is collected, dried and purified to give 2-phenyl-1,3,4-thiadiazole-5-thiol, m.p. about 216° C.

Example 3

A 1000 gallon still was charged with 920 l. of ethanol and 123.5 kg. of thioacetamide and the mixture was stirred at about 30° C. until dissolution of the thioacetamide was complete. The solution was filtered into a brine pot and cooled to a temperature of about 0° C. Hydrazine hydrate, 106 kg., was added to the mixture at such a rate as to maintain a temperature not greater than about 15° C. The reactants were stirred at about 10° C. for about 1 hour. The reaction mixture was cooled to about 0° C., and 198 l. of carbon disulfide was added to the reaction mixture while the temperature was maintained below 10° C. Potassium hydroxide, 91 kg., dissolved in 500 l. of ethanol was added to the reaction mixture while the temperature was kept below 10° C. Upon completion of the alcohol-alkali addition, the reaction mixture was warmed to about 30° C. and stirred for 2 hours at that temperature. The reaction mixture was diluted with 500 l. of deionized water and 330 kg. of concentrated sulfuric acid was added to the reaction mixture at a rate such that the caustic scrubbers provided for the purpose absorbed the hydrogen sulfide that was liberated. After acidification was complete, the mixture was cooled below 35° C. and stirred for 30 minutes at about 30° C. Traces of hydrogen sulfide were removed at reduced pressure after the mixture was cooled to about 15° C. Atmospheric pressure was restored, and the reaction mixture was diluted with 500 l. of deionized water. Water and ethanol were distilled off at reduced pressure at a temperature of about 50° C. The reaction mixture was held under reduced pressure for 30 minutes at about 50° C. Atmospheric pressure was restored, and the mixture was diluted with 300 l. of deionized water. The diluted mixture was cooled to about 10° C., and the precipitated product was collected by filtration. The filter cake was washed to remove sulfate salts, and the product was dried at 60° C. The yield was 185 kg. (85%) of 2-methyl-1,3,4-thiadiazole-5-thiol. The assay of the product was 99.6% by nonaqueous titration.

We claim:

1. The process for the preparation of 2-substituted-1,3,4-thiadiazole-5-thiol of the formula

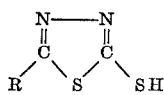

wherein R is $C_1$-$C_4$ lower alkyl, benzyl or phenyl, which comprises (a) reacting molar equivalents of a thioamide of the formula

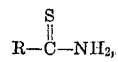

wherein R is the same as defined above, and hydrazine in an inert solvent at a temperature between 0° and 60° C.;

(b) adding to said reaction mixture one molar equivalent of an alkali metal hydroxide and at least one molar equivalent of carbon disulfide;

(c) acidifying the reaction mixture with a mineral acid; and (d) recovering the 2-substituted-1,3,4-thiadiazole-5-thiol from said reaction mixture.

2. The process of Claim 1 wherein the thioamide is thioacetamide.

3. The process of Claim 1 wherein the inert solvent is ethanol.

4. The process of Claim 1 wherein the alkali-metal hydroxide is potassium hydroxide.

5. The process of Claim 1 wherein the mineral acid is sulfuric acid.

References Cited

UNITED STATES PATENTS 2,744,908   5/1956   Young _____ 260—302 SD

RICHARD J. GALLAGHER, Primary Examiner